(12) United States Patent
Osterwald

(10) Patent No.: US 6,871,642 B1
(45) Date of Patent: Mar. 29, 2005

(54) INTERNAL COMBUSTION ENGINE WITH AN EXHAUST GAS TURBOCHARGER AND AN EXHAUST GAS RECIRCULATION DEVICE AND METHOD OF OPERATING SAME

(75) Inventor: Henning Osterwald, Leutenbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/787,255

(22) Filed: Feb. 27, 2004

(51) Int. Cl.$^7$ .............................................. F02D 47/08
(52) U.S. Cl. .......................... 123/568.11; 123/568.14; 123/568.21; 123/559.1
(58) Field of Search ...................... 123/568.11, 568.14, 123/568.15, 568.21, 559.1, 90.1

(56) References Cited

U.S. PATENT DOCUMENTS

| | | | |
|---|---|---|---|
| 4,179,892 A | 12/1979 | Heydrich | ..................... 60/605 |
| 4,364,345 A * | 12/1982 | Tsutsumi et al. | ........ 123/198 F |
| 5,562,086 A * | 10/1996 | Asada et al. | ............ 123/568.21 |
| 5,934,263 A * | 8/1999 | Russ et al. | ................... 123/698 |

FOREIGN PATENT DOCUMENTS

DE     28 55 687     8/1982

* cited by examiner

*Primary Examiner*—Bibhu Mohanty
(74) *Attorney, Agent, or Firm*—Crowell & Moring LLP

(57) ABSTRACT

An internal combustion engine is provided which has an exhaust gas turbocharger and an exhaust gas recirculation device, and in which valve control times of intake valves and/or outlet valves of the individual cylinders of the internal combustion engine are different. Cylinders which supply an exhaust gas recirculation device have shorter valve overlap times or none at all in comparison with cylinders that do not supply the exhaust gas recirculation device. The internal combustion engine is preferably embodied as a diesel engine for truck applications.

30 Claims, 2 Drawing Sheets

INTERNAL COMBUSTION ENGINE WITH AN EXHAUST GAS TURBOCHARGER AND AN EXHAUST GAS RECIRCULATION DEVICE AND METHOD OF OPERATING SAME

BACKGROUND AND SUMMARY OF THE INVENTION

The invention relates to an internal combustion engine with an exhaust gas turbocharger and an exhaust gas recirculation device. Preferred embodiments of the invention relate to an internal combustion engine having an exhaust gas turbocharger and an exhaust gas recirculation device, whereby the internal combustion engine has a plurality of cylinders and each cylinder of the internal combustion engine has at least one intake valve and at least one outlet valve, and a compressor of the exhaust gas turbocharger is assigned to an inlet and an asymmetrical exhaust gas turbine of the exhaust gas turbocharger is assigned to an outlet of the internal combustion engine, the compressor is connected to the inlet via a charge air line, the exhaust gas turbine has two intake ports with different flow cross sections which are separated from one another by means of a partition and each inflow channel is connected to the outlet through its own exhaust gas inlet line whereby each exhaust gas inlet line is assigned a partial number of cylinders of the internal combustion engine and an exhaust gas recirculation line leads from the exhaust gas inlet line of the intake port having the smaller flow cross section to the charge air line.

There are known supercharged internal combustion engines, in particular diesel engines, which are equipped with an exhaust gas recirculation device to improve exhaust performance. The exhaust gas recirculation by means of the exhaust gas recirculation device serves in particular to reduce NOx emissions. These internal combustion engines have an exhaust gas turbocharger whose compressor is assigned to an inlet and whose exhaust gas turbine is assigned to an outlet of the internal combustion engine. The exhaust gas turbine and the outlet are connected by at least one exhaust gas inlet line from which an exhaust gas recirculation line of the exhaust gas recirculation device branches off. The exhaust gas recirculation line opens into a charge air line which connects the compressor to the inlet. An exhaust gas recirculation valve with which the exhaust gas recirculation is controllable is provided in the exhaust gas recirculation line.

U.S. Pat. No. 4,179,892 (corresponding German Patent DE 28 5 687 C2) describes an internal combustion engine in which the exhaust gas turbine has two separate intake ports (referred to as scroll channels in this publication) and an exhaust gas inlet line (referred to in the publication as an exhaust gas line) is assigned to each intake port. The exhaust gas inlet lines connect the intake ports to the outlet of the internal combustion engine. Each exhaust gas inlet line is connected separately from the others to a partial number of cylinders of the internal combustion engine. The intake ports have different flow cross sections. The exhaust gas recirculation line branches off from the exhaust gas inlet line which is assigned to the intake port having the smaller flow cross section. The flow cross section of the intake port and/or the exhaust gas inlet line is advantageously selected to be so small that there is a negative purging gradient so that at least a portion of the exhaust gas flows through the exhaust gas recirculation line into the charge air line. The recirculated exhaust is distributed uniformly among the cylinders.

The negative purging gradient results in an inferior purging and/or an increase in an internal exhaust gas recirculation of the cylinders which supply the exhaust gas recirculation device.

It has been found that with a uniform distribution of the recirculated exhaust gas to all the cylinders of the internal combustion engine, the exhaust gases of the cylinders supplying the exhaust gas recirculation device have a lower NOx concentration and a higher CO concentration in the exhaust than do the cylinders which do not supply the exhaust gas recirculation device. The higher CO concentration is an indicator of a low $\lambda$ value, which is reflected in an increased output of carbon black and/or particles in diesel engine combustion.

An object of the present invention is to make available an internal combustion engine of the type referred to above so that its emissions are distributed uniformly over all the cylinders of the internal combustion engine.

This object is achieved according to certain preferred embodiments of the invention by providing an internal combustion engine having an exhaust gas turbocharger and an exhaust gas recirculation device, whereby the internal combustion engine has a plurality of cylinders and each cylinder of the internal combustion engine has at least one intake valve and at least one outlet valve, and a compressor of the exhaust gas turbocharger is assigned to an inlet and an asymmetrical exhaust gas turbine of the exhaust gas turbocharger is assigned to an outlet of the internal combustion engine, the compressor is connected to the inlet via a charge air line, the exhaust gas turbine has two intake ports with different flow cross sections which are separated from one another by means of a partition and each inflow channel is connected to the outlet through its own exhaust gas inlet line whereby each exhaust gas inlet line is assigned a partial number of cylinders of the internal combustion engine and an exhaust gas recirculation line leads from the exhaust gas inlet line of the intake port having the smaller flow cross section to the charge air line, wherein a control unit is provided to control the valve control times of the intake valves and/or the outlet valves of the individual cylinders of the internal combustion engine differently whereby the cylinders supplying the exhaust gas recirculation device have shorter valve overlap times or none at all in comparison with the cylinders not supplying the exhaust gas recirculation device.

Preferred embodiments of the inventive internal combustion engine are characterized by the valve control times of the intake valves and/or the outlet valves of the individual cylinders of the internal combustion engine which are provided differently, whereby the cylinders supplying the exhaust gas recirculation device have shorter valve overlap times or none at all in comparison with the cylinders that do not supply the exhaust gas recirculation device. The internal combustion engine has an exhaust gas turbocharger having an asymmetrical exhaust gas turbine. The asymmetrical exhaust gas turbine has two intake ports which have a different flow cross section. One flow cross section is selected to be so small that it results in a negative flow gradient on the partial number of cylinders that are connected to the intake port having the smaller flow cross section. The exhaust gas of this cylinder can thereby be recirculated via an exhaust gas recirculation device. The valve control times of the intake valves and the outlet valves usually have a valve overlap in internal combustion engines, i.e., the inlet opens before the outlet closes. Due to the valve overlap, there is internal exhaust gas recirculation in particular when there is a negative purging gradient. When the inlet is opened, the pressure in the cylinder space drops below the exhaust gas pressure and exhaust remains in the cylinder space or flows out of the outlet and back (internal exhaust gas recirculation). The degree of internal exhaust gas recirculation can be influenced with the design of the valve overlap times and can be shortened to advantage. This makes it possible to keep the NOx emissions at a required level while at the same time lowering CO emissions which is reflected in reduced carbon black and particulate emissions.

Advantageous refinements of and improvements on the above discussed preferred embodiment of an internal combustion engine are described herein and in the claims.

In certain preferred embodiments of this invention, the valve control times of the intake valves of the cylinders supplying the exhaust gas recirculation device are retarded. Advantageously the retarding of the valve control times is performed with a uniform valve lift diagram by five degrees of crank angle in the retarded direction.

In certain other preferred embodiments of this invention, the recirculated exhaust is divided in different ratios among the individual cylinders of the internal combustion engine, with a partial number of the cylinders of the internal combustion engine receiving all or most of the recirculated exhaust gas while the remaining cylinders receive the smallest amount of the recirculated exhaust gas or none at all. The ratio of the charge air required for combustion and the exhaust gas recirculated from the internal exhaust gas recirculation by means of the exhaust gas recirculation device can be balanced out among the cylinders of the internal combustion engine.

In certain other preferred embodiments of this invention, the cylinders that do not supply the exhaust gas recirculation device receive the largest amount or all of the recirculated exhaust and the cylinders supplying the exhaust gas recirculation device receive the smallest amount or none of the recirculated exhaust. In an expedient embodiment of this division, the cylinders not supplying the exhaust gas recirculation device receive a 70% portion of the exhaust recirculated via the exhaust gas recirculation device. The cylinders supplying the exhaust gas recirculation device receive a 30% share accordingly.

In certain other preferred embodiments of this invention the internal combustion engine is designed in the form of an in-line design with four or six cylinders, whereby the partial number of cylinders not supplying the exhaust gas recirculation device amounts to at least half of the cylinders of the internal combustion engine. Due to the negative purging gradient on the cylinders supplying the exhaust gas recirculation device, the efficiency drops because of the inferior purging of the cylinders. The loss of efficiency can be compensated by optimized charge alternation of the cylinders that do not supply the exhaust gas recirculation device. In order to avoid a negative effect on the overall efficiency of the internal combustion engine, the partial number of cylinders supplying the exhaust gas recirculation device is limited to at most half of the cylinders of the internal combustion engine.

In certain other preferred embodiments of this invention, an exhaust gas recirculation valve in the form of a throttle valve is provided in the exhaust gas recirculation line. The exhaust gas recirculation valve is controllable by means of a signal line by a control unit of the internal combustion engine. Thus the exhaust gas recirculation is controllable by means of the exhaust gas recirculation device and is adaptable to an engine characteristics map of the internal combustion engine.

Additional features and combinations of features are derived from the description and the drawing. A concrete exemplary embodiment of this invention is shown in simplified form in a drawing and explained in greater detail in the following description.

Other objects, advantages and novel features of the present invention will become apparent from the following detailed description of the invention when considered in conjunction with the accompanying drawings.

DETAILED DESCRIPTION OF THE DRAWINGS

Figure 1:
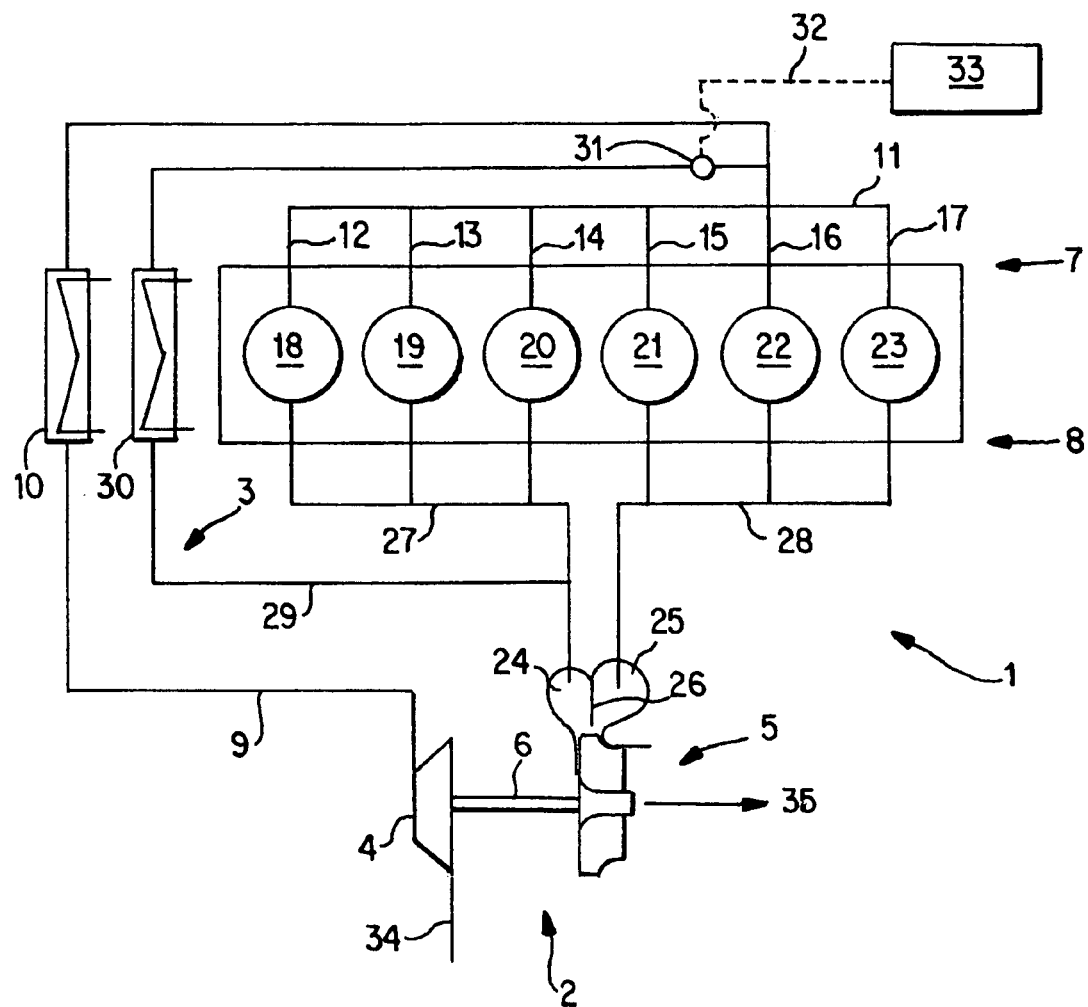
FIG. 1 shows a schematically simplified diagram of the inventive internal combustion engine according to a single exemplary embodiment.

FIG. 1 shows a first embodiment of an inventive internal combustion engine 1. The internal combustion engine 1 is preferably designed as a diesel engine in series design and has an exhaust gas turbocharger 2 and an exhaust gas recirculation device 3. The exhaust gas turbocharger 2 has a compressor 4 and an asymmetrical exhaust gas turbine 5. The compressor 4 and the exhaust gas turbine 5 are connected to one another rotationally by a shaft 6. The compressor 4 is assigned to an inlet 7 and the asymmetrical exhaust gas turbine 5 is assigned to an outlet 8 of the internal combustion engine 1.

The compressor 4 is connected to the inlet 7 via a charge air line 9. A charge air cooler 10 is provided in the charge air line 9. The inlet 7 has an air charging distribution tube 11 from which at least one air charging channel 12, 13, 14, 15, 16, 17 leads to a cylinder 18, 19, 20, 21, 22, 23 of the internal combustion engine 1. The cylinders of the internal combustion engine 1 each have at least one intake valve (not shown) and an outlet valve (not shown). The charge air line 9 opens into the charge air distribution tube 11.

The asymmetrical exhaust gas turbine 5 has two intake ports 24, 25 which are separated from one another by a partition 26 and have different flow cross sections. Each inflow channel 24, 25 is connected to a separate exhaust gas inlet line 27, 28 of the outlet 8 of the internal combustion engine 1. It is also contemplated that the exhaust gas inlet lines 27, 28 may have different cross sections according to the flow cross sections of the inflow channels 24, 25. Each exhaust gas inlet line 27, 28 is assigned a partial number of cylinders of the internal combustion engine 1. In the exemplary embodiment, the exhaust gas inlet line 27 is assigned the cylinders 18, 19, 20 and the exhaust gas inlet line 28 is assigned the cylinders 21, 22, 23. A different allocation of the cylinders to the exhaust gas inlet lines 27, 28 is also contemplated. In addition, the internal combustion engine 1 may also have a different number of cylinders and a different design.

An exhaust gas recirculation line 29 of the exhaust gas recirculation device 3 branches off from the exhaust gas inlet line 27. The exhaust gas recirculation line 29 opens into the charge air line 9 just before the mouth of the charge air line 9 into the charge air distribution tube 11. In addition to the exhaust gas recirculation line 9, the exhaust gas recirculation device 3 includes an exhaust gas recirculation cooler 30 and exhaust gas recirculation valve 31. The exhaust gas recirculation valve 31 is designed as a throttle valve and is operable with an electric or pneumatic actuating element (not shown). The actuating element is triggerable via a signal line 32 by a controller 33 of the internal combustion engine 1. Thus an exhaust gas recirculation is controllable by means of the exhaust gas recirculation device 3 and is adaptable to an engine characteristics map of the internal combustion engine 1. The exhaust gas recirculation valve 31 is preferably provided close to the opening of the exhaust gas recirculation line 29 into the charge air line 9. Mounting the exhaust gas recirculation valve 31 in the exhaust gas recirculation line 29 near the mouth into the exhaust gas inlet line 27 or directly on the exhaust gas inlet line 27 is also contemplated.

The compressor 4 is driven by the asymmetrical gas turbine 5. The compressor 4 supplies the charge air required for combustion. The compressor 4 draws in the air required for combustion through an intake line 34 from the atmosphere. The compressed charge air flows through the charge air line 9 and the charge air cooler 10 into the charge air distribution tube 11 of the inlet 7 and through the charge air channels 12, 13, 14, 15, 16, 17 and continues into the cylinders 18, 19, 20, 21, 22, 23 of the internal combustion engine 1. The exhaust gases of the cylinders 18, 19, 20, 21, 22, 23 flow into the exhaust gas inlet lines 27, 28 of the outlet 8 into the intake ports 24, 25 of the exhaust gas turbine 5. The exhaust gas drives the exhaust gas turbine 5 and flows through an exhaust gas system 35, represented by an arrow in FIG. 1, into the atmosphere.

Due to the different flow cross sections of the intake ports 24, 25, the exhaust gas pressures in the exhaust gas inlet lines 27, 28 are different. The partition 26 between the intake ports 24, 25 prevents an equalization of pressure between the intake ports 24, 25. The smaller flow cross section of the intake port 24 generates a negative purging gradient on the cylinders 18, 19, 20. Due to the negative purging gradient, the exhaust gas pressure is higher than the charge air pressure so that at least a portion of the exhaust gas flows into the charge air line 9 through the exhaust gas recirculation line 29 when the exhaust gas recirculation valve 31 of the exhaust gas recirculation device 3 is opened. The recirculated exhaust is cooled in the exhaust gas recirculation cooler 30 and thus serves to reduce NOx emissions in particular. The larger flow cross section of the intake port 25 results in a positive purging gradient on the cylinders 21, 22, 23, resulting in the highest possible efficiency.

Due to the negative purging gradient, the purging of the cylinders 18, 19, 20 that supply the exhaust gas recirculation line changes in such a way that more exhaust remains in the cylinders 18, 19, 20 which supply the exhaust gas recirculation device 3 and/or more gas flows back through the outlet 8 than in the cylinders 21, 22, 23 that do not supply the exhaust gas recirculation device 3 (internal exhaust gas recirculation).

The charge air line 9 does not open centrally into the charge air distribution tube 11 but instead opens eccentrically, so that at the cylinders 21, 22, 23, the charge air and the entrained recirculated exhaust flow into the charge air channels 15, 16, 17 on entering the charge air distribution tube 11. Thus the cylinders 21, 22, 23 which do not supply the exhaust gas recirculation device 3 receive the greater and/or total amount of the exhaust gas recirculated by means of the exhaust gas recirculation device 3. Therefore the ratio of the internal exhaust gas recirculation and the exhaust gas recirculated by means of the exhaust gas recirculation device 3 to the charge air required for combustion in the cylinders 18, 19, 20, 21, 22, 23 of the internal combustion engine 1 is controllable. This advantageously results in a uniform distribution of emissions over all the cylinders of the internal combustion engine 1.

Another contemplated design of the inventive internal combustion engine 1 is one in which the cylinders 18, 19, 20 and the cylinders 21, 22, 23 each have separate air charging distribution tubes 11 and the exhaust gas recirculation line 29 opens only into the charge air distribution tube 11 that is assigned to the cylinders 21, 22, 23 that do not supply the exhaust gas recirculation device 3.

Another contemplated design of the internal combustion engine 1 according to this invention is one in which the exhaust gas recirculated by means of the exhaust gas recirculation device 3 is sent directly to the air charging channels 15, 16, 17.

An embodiment of the inventive internal combustion engine 1 in which the exhaust gas recirculation valve 31 is designed as a switched throttle valve is also conceivable. This makes it possible, for example, to add the recirculated exhaust gas to the charge air only when the charge air flows into a cylinder 21, 22, 23 that does not supply the exhaust gas recirculation device 3.

Figure 2:
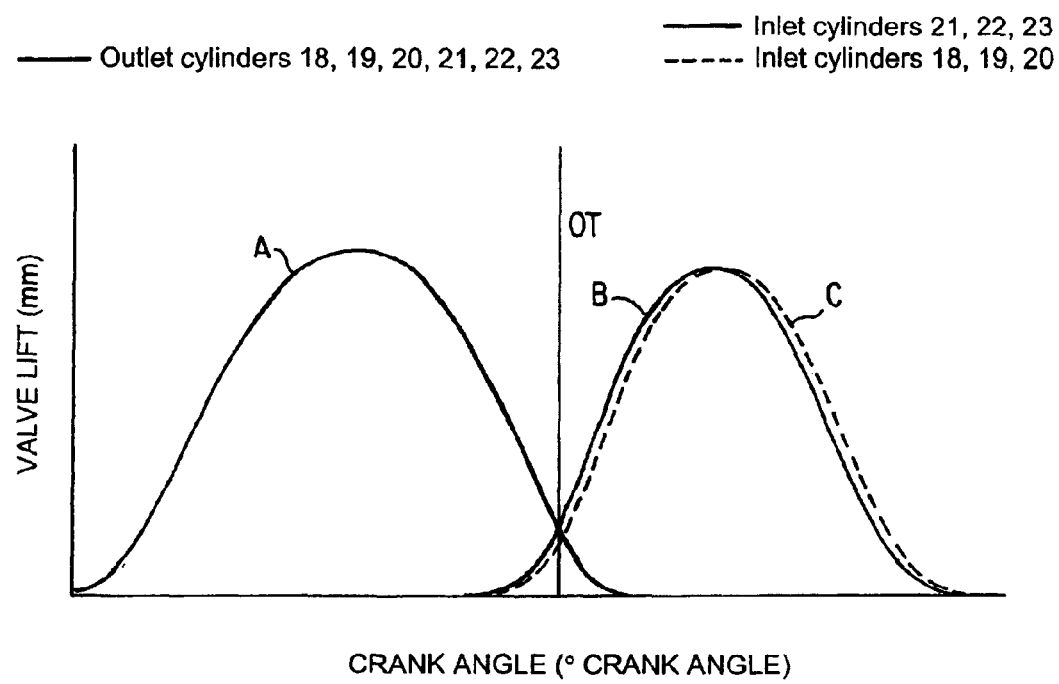
FIG. 2 shows a simplified diagram of the valve control times of the inventive internal combustion engine.

FIG. 2 shows a simplified diagram of the valve control times of the inventive internal combustion engine 1. The diagram shows a valve lift diagram A for all the outlet valves of the cylinders 18, 19, 20, 21, 22, 23, a valve lift diagram B for the intake valves of the cylinders 21, 22, 23 and a valve lift diagram C of the cylinders 18, 19, 20 of the internal combustion engine. The valve lift diagrams A, B, C are plotted in valve lift in millimeters as a function of the crank angle in degrees of crank angle.

In addition or as an exclusive measure for the inventive internal combustion engine 1 illustrated in FIG. 1, the valve control times of the cylinders 18, 19, 20 supplying the exhaust gas recirculation device 3 are varied in the manner according to this invention so that the intake valves and outlet valves of the cylinders 18, 19, 20 supplying the exhaust gas recirculation device 3 have shorter valve overlap times or none at all in comparison with the cylinders 21, 22, 23 that do not supply the exhaust gas recirculation device 3. As shown in the diagram, the valve control times of all the outlet valves always remain unchanged while the valve control times of the inlet valves of the cylinders 18, 19, 20 which supply the exhaust gas recirculation device 3 are retarded by 5° of crank angle. The inner exhaust gas recirculation in the case of the cylinders 18, 19, 20 which supply the exhaust gas recirculation device 3 is advantageously significantly reduced even at a negative purging gradient.

It is thus possible to counteract the overproportional internal exhaust gas recirculation on the cylinders 18, 19, 20 that supply the exhaust gas recirculation device 3 and to uniformly distribute the emissions over all the cylinders of the internal combustion engine. In contrast with that, the exhaust gas recirculated through the exhaust gas recirculation device 3 in the case of the internal combustion engine 1 according to FIG. 1 is divided differently among the individual cylinders 18, 19, 20, 21, 22, 23 of the internal combustion engine 1 in order to distribute the emissions uniformly over all the cylinders of the internal combustion engine.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Internal combustion engine having an exhaust gas turbocharger and an exhaust gas recirculation device, whereby the internal combustion engine has a plurality of cylinders and each cylinder of the internal combustion engine has at least one intake valve and at least one outlet valve, and a compressor of the exhaust gas turbocharger is assigned to an inlet and an asymmetrical exhaust gas turbine of the exhaust gas turbocharger is assigned to an outlet of the internal combustion engine, the compressor is connected to the inlet via a charge air line, the exhaust gas turbine has two intake ports with different flow cross sections which are separated from one another by means of a partition and each inflow channel is connected to the outlet through its own exhaust gas inlet line whereby each exhaust gas inlet line is assigned a partial number of cylinders of the internal combustion engine and an exhaust gas recirculation line leads from the exhaust gas inlet line of the intake port having the smaller flow cross section to the charge air line, wherein a control unit is provided to control the valve control times of the respective intake valves and/or the outlet valves of the individual cylinders of the internal combustion engine to be different with the cylinders supplying the exhaust gas recirculation device having shorter valve overlap times or none at all in comparison with the cylinders not supplying the exhaust gas recirculation device.

2. Internal combustion engine as claimed in claim 1, wherein the valve control times of the intake valves of the cylinders which supply the exhaust gas recirculation device are retarded.

3. Internal combustion engine as claimed in claim 1, wherein the recirculated exhaust gas is divided differently among the individual cylinders of the internal combustion engine, with a partial number of cylinders of the internal combustion engine receiving the largest amount or the total amount of the recirculated exhaust gas and the remaining cylinders receiving the smallest amount or none at all of the recirculated exhaust gas.

4. Internal combustion engine as claimed in claim 2, wherein the recirculated exhaust gas is divided differently among the individual cylinders of the internal combustion engine, with a partial number of cylinders of the internal combustion engine receiving the largest amount or the total amount of the recirculated exhaust gas and the remaining cylinders receiving the smallest amount or none at all of the recirculated exhaust gas.

5. Internal combustion engine as claimed in claim 3, wherein the cylinders which do not supply the exhaust gas recirculation device receive the largest amount of the recirculated exhaust gas or the total amount, and the cylinders supplying the exhaust gas recirculation device receive the smallest amount of recirculated exhaust gas or none at all.

6. Internal combustion engine as claimed in claim 4, wherein the cylinders which do not supply the exhaust gas recirculation device receive the largest amount of the recirculated exhaust gas or the total amount, and the cylinders supplying the exhaust gas recirculation device receive the smallest amount of recirculated exhaust gas or none at all.

7. Internal combustion engine as claimed in claim 1, wherein the internal combustion engine is designed in the form of a series design having four or six cylinders whereby a partial number of the cylinders that do not supply the exhaust gas recirculation device amounts to at least half of the total number of the cylinders of the internal combustion engine.

8. Internal combustion engine as claimed in claim 2, wherein the internal combustion engine is designed in the form of a series design having four or six cylinders whereby a partial number of the cylinders that do not supply the exhaust gas recirculation device amounts to at least half of the total number of the cylinders of the internal combustion engine.

9. Internal combustion engine as claimed in claim 3, wherein the internal combustion engine is designed in the form of a series design having four or six cylinders whereby a partial number of the cylinders that do not supply the exhaust gas recirculation device amounts to at least half of the total number of the cylinders of the internal combustion engine.

10. Internal combustion engine as claimed in claim 4, wherein the internal combustion engine is designed in the form of a series design having four or six cylinders whereby a partial number of the cylinders that do not supply the exhaust gas recirculation device amounts to at least half of the total number of the cylinders of the internal combustion engine.

11. Internal combustion engine as claimed in claim 5, wherein the internal combustion engine is designed in the form of a series design having four or six cylinders whereby a partial number of the cylinders that do not supply the exhaust gas recirculation device amounts to at least half of the total number of the cylinders of the internal combustion engine.

12. Internal combustion engine as claimed in claim 6, wherein the internal combustion engine is designed in the form of a series design having four or six cylinders whereby a partial number of the cylinders that do not supply the exhaust gas recirculation device amounts to at least half of the total number of the cylinders of the internal combustion engine.

13. Internal combustion engine as claimed in claim 1, wherein an exhaust gas recirculation valve in the form of a throttle valve is provided in the exhaust gas recirculation line.

14. Internal combustion engine as claimed in claim 2, wherein an exhaust gas recirculation valve in the form of a throttle valve is provided in the exhaust gas recirculation line.

15. Internal combustion engine as claimed in claim 3, wherein an exhaust gas recirculation valve in the form of a throttle valve is provided in the exhaust gas recirculation line.

16. Internal combustion engine as claimed in claim 4, wherein an exhaust gas recirculation valve in the form of a throttle valve is provided in the exhaust gas recirculation line.

17. Internal combustion engine as claimed in claim 5, wherein an exhaust gas recirculation valve in the form of a throttle valve is provided in the exhaust gas recirculation line.

18. Internal combustion engine as claimed in claim 6, wherein an exhaust gas recirculation valve in the form of a throttle valve is provided in the exhaust gas recirculation line.

19. Internal combustion engine as claimed in claim 7, wherein an exhaust gas recirculation valve in the form of a throttle valve is provided in the exhaust gas recirculation line.

20. Internal combustion engine as claimed in claim 8, wherein an exhaust gas recirculation valve in the form of a throttle valve is provided in the exhaust gas recirculation line.

21. Internal combustion engine as claimed in claim 9, wherein an exhaust gas recirculation valve in the form of a throttle valve is provided in the exhaust gas recirculation line.

22. Internal combustion engine as claimed in claim 10, wherein an exhaust gas recirculation valve in the form of a throttle valve is provided in the exhaust gas recirculation line.

23. Internal combustion engine as claimed in claim 11, wherein an exhaust gas recirculation valve in the form of a throttle valve is provided in the exhaust gas recirculation line.

24. Internal combustion engine as claimed in claim 12, wherein an exhaust gas recirculation valve in the form of a throttle valve is provided in the exhaust gas recirculation line.

25. A method of operating an internal combustion engine having an exhaust gas turbocharger and an exhaust gas recirculation device, whereby the internal combustion engine has a plurality of cylinders and each cylinder of the internal combustion engine has at least one intake valve and at least one outlet valve, and a compressor of the exhaust gas turbocharger is assigned to an inlet and an asymmetrical exhaust gas turbine of the exhaust gas turbocharger is assigned to an outlet of the internal combustion engine, the compressor is connected to the inlet via a charge air line, the exhaust gas turbine has two intake ports with different flow cross sections which are separated from one another by means of a partition and each inflow channel is connected to the outlet through its own exhaust gas inlet line whereby each exhaust gas inlet line is assigned a partial number of cylinders of the internal combustion engine and an exhaust gas recirculation line leads from the exhaust gas inlet line of the intake port having the smaller flow cross section to the charge air line, said method comprising:

controlling the valve control times of the respective intake valves and/or the outlet valves of the individual cylinders of the internal combustion engine to be different with the cylinders supplying the exhaust gas recirculation device having shorter valve overlap times or none at all in comparison with the cylinders not supplying the exhaust gas recirculation device.

26. A method according to claim 25, wherein the valve control times of the intake valves of the cylinders which supply the exhaust gas recirculation device are retarded.

27. A method according to claim 25, wherein the recirculated exhaust gas is divided differently among the individual cylinders of the internal combustion engine, with a partial number of cylinders of the internal combustion engine receiving the largest amount or the total amount of the recirculated exhaust gas and the remaining cylinders receiving the smallest amount or none at all of the recirculated exhaust gas.

28. A method according to claim 27, wherein the cylinders which do not supply the exhaust gas recirculation device receive the largest amount of the recirculated exhaust gas or the total amount, and the cylinders supplying the exhaust gas recirculation device receive the smallest amount of recirculated exhaust gas or none at all.

29. A method according to claim 25, wherein the internal combustion engine is designed in the form of a series design having four or six cylinders whereby a partial number of the cylinders that do not supply the exhaust gas recirculation device amounts to at least half of the total number of the cylinders of the internal combustion engine.

30. A method according to claim 25, wherein an exhaust gas recirculation valve in the form of a throttle valve is provided in the exhaust gas recirculation line.

\* \* \* \* \*